Patented Mar. 21, 1933

1,902,115

UNITED STATES PATENT OFFICE

ARTHUR W. CAMPBELL, OF STOW, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed March 14, 1932. Serial No. 598,886.

This invention relates to the art of rubber manufacture, and particularly to the preparation of rubber compositions which resist the deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

It has heretofore been found that triphenyl methyl chloride will react with diphenyl-amine to produce a secondary amine, which may be designated as p-phenylamino terra-phenyl methane or p-triphenylmethyl diphenylamine, and which melts at 242° C. I have discovered, however, that when triphenyl methyl chlorde is reacted with diphenylamine in the presence of anhydrous aluminum chloride, the course of the reaction is modified and a considerable proportion of a new material is formed, which has the same empirical composition as the p-phenylamino tetraphenyl methane referred to above, but has a much higher melting point, namely, 350° C. The new substance exhibits the usual properties of a diarylamine and is believed to have the following structural formula

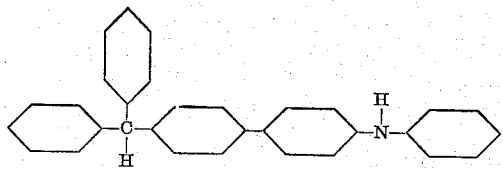

This substance may accordingly be designated as p-diphenylmethyl p′-phenylamino biphenyl.

The substances which are employed as anti-oxidants according to this invention are the homologues of the new amine described above. They may be prepared in general by the same reaction, the appropriate reagents, such as tritolyl methyl chloride, trinaphthyl methyl chloride, tribiphenyl methyl chloride, and phenyl-tolyl amine, phenyl naphthylamine, phenyl biphenylamine, etc. being substituted for the triphenylmethyl chloride and diphenylamine, of the above type reaction.

As a specific example of a preferred embodiment of the invention, p-diphenylmethyl p′-phenlyamino biphenyl is prepared as follows: 546 parts by weight of dry benzene and 308 parts of dry carbon tetrachloride are placed in a glass lined kettle equipped with an agitator and reflux condenser. 267 parts of anhydrous aluminum chloride are gradually added, while the mixture is stirred, whereupon triphenylmethyl chloride is rapidly formed. About an hour after the last of the aluminum chloride is added 338 parts of diphenylamine dissolved in an equal quantity of benzene are added and the batch is heated to refluxing temperature for an hour. 500 parts of water are then added to decompose the aluminum chloride complex formed, the heat of the reaction being sufficient to distill off all the free benzene. The mixture is then washed successively with hot water, sodium hydroxide solution and water, to eliminate the aluminum chloride, is dried, and dissolved in a hot high boiling solvent such as o-dichlorbenzene or light mineral oil. Upon cooling this solution the desired product, p-diphenylmethyl p′-phenylamino biphenyl, precipitates and may be filtered off and washed. It is a light brown powder melting well above 300° C., and approximately at 350° C. when pure.

The anti-oxidants of this invention may be incorporated into any type of rubber composition with good effect on its resistance to aging. For instance, from ¼ to 5% of the anti-oxidant may be mixed with the rubber before vulcanization, the anti-oxidant having substantially no accelerating effect and therefore ordinarily not necessitating an adjustment of vulcanizing conditions. Alternately, the anti-oxidant may be applied to the surface of crude or vulcanized rubber, say in the form of a powder, paste, or solution. Rubber so treated resists deterioration due to age and exposure to the elements far better than similar untreated rubber.

As a specific example, a tire tread composition is prepared containing blended plantation rubber 100 parts by weight, sulfur 5.5 parts, zinc oxide 30 parts, gas black 40 parts, mineral rubber 10 parts, palm oil 5 parts, and hexamethylene tetramine 0.75 parts. This is divided into portions, one of which is used as a control, while 0.95 parts (0.5% of the composition) of p-diphenylmethyl p'phenylamino biphenyl is added to another portion. After vulcanization in a press for 45 minutes at 145° C. (294° F.) to produce an optimum cure, the respective compositions are subjected to an accelerated aging test consisting in the determination of their physical properties before and after heating for 7 days in a constantly renewed stream of air at 70° C. (158° F.) The rubber composition without anti-oxidant deteriorates far more rapidly than the treated composition, losing the greater part of its strength during the test described above, while the treated composition is little affected.

Obviously, the practice of this invention is not limited to the specific compositions given above, such compositions being merely illustrative of one manner of employing the anti-oxidants of this invention. The anti-oxidants may be employed in conjunction with other vulcanizing agents or accelerators than those here specifically disclosed, for this invention is applicable generally to pure rubber or rubber compositions of the most varied nature.

It is to be understood that the term "treating" as employed in the appended claims is used in a generic sense to include either the incorporation of the anti-oxidants into the rubber by milling or a similar process, or their addition to rubber latex before its coagulation, or their application to the surface of a mass of crude or vulcanized rubber. The term "rubber" is likewise employed in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed a preferred embodiment of my invention I do not desire to limit myself solely thereto, for as hitherto stated many modifications may be made without departing from the spirit and scope of the invention as defined in the appended claims.

I claim:

1. The method of preserving rubber which comprises treating rubber with a secondary aromatic amine obtained by the reaction of a triaryl methyl chloride with a diarylamine in the presence of anhydrous aluminum chloride.

2. The method of preserving rubber which comprises treating rubber with a secondary aromatic amine obtained by the reaction of triphenyl methyl chloride with diphenylamine in the presence of anhydrous aluminum chloride and having a melting point above 300° C.

3. The method of preserving rubber which comprises treating rubber with a secondary aromatic amine containing a diarylmethyl group and an arylamino group on different rings of a biaryl nucleus.

4. The method of preserving rubber which comprises treating rubber with a secondary aromatic amine containing a diphenylmethyl group and an arylamino group on different rings of a biphenyl nucleus.

5. The method of preserving rubber which comprises treating rubber with p-diphenylmethyl p'-phenylamino biphenyl.

6. The method of preserving rubber which comprises vulcanizing a rubber composition comprising rubber, sulphur, an organic accelerator, and a secondary aromatic amine containing a diarylmethyl group and an arylamino group on different rings of a biaryl nucleus.

7. The method of preserving rubber which comprises vulcanizing a rubber composition comprising rubber, sulphur, an organic accelerator, and p-diphenylmethyl p'-phenylamino biphenyl.

8. A rubber composition comprising rubber and a secondary aromatic amine containing a diarylmethyl group and an arylamino group on different rings of a biaryl nucleus.

9. A rubber composition comprising rubber and a secondary aromatic amine containing a diphenylmethyl group and an arylamino group on different rings of a biphenyl nucleus.

10. A rubber composition comprising rubber and p-diphenylmethyl p'-phenylamino biphenyl.

In witness whereof I have hereunto set my hand this 7th day of March, 1932.

ARTHUR W. CAMPBELL.